United States Patent Office 3,512,483
Patented May 19, 1970

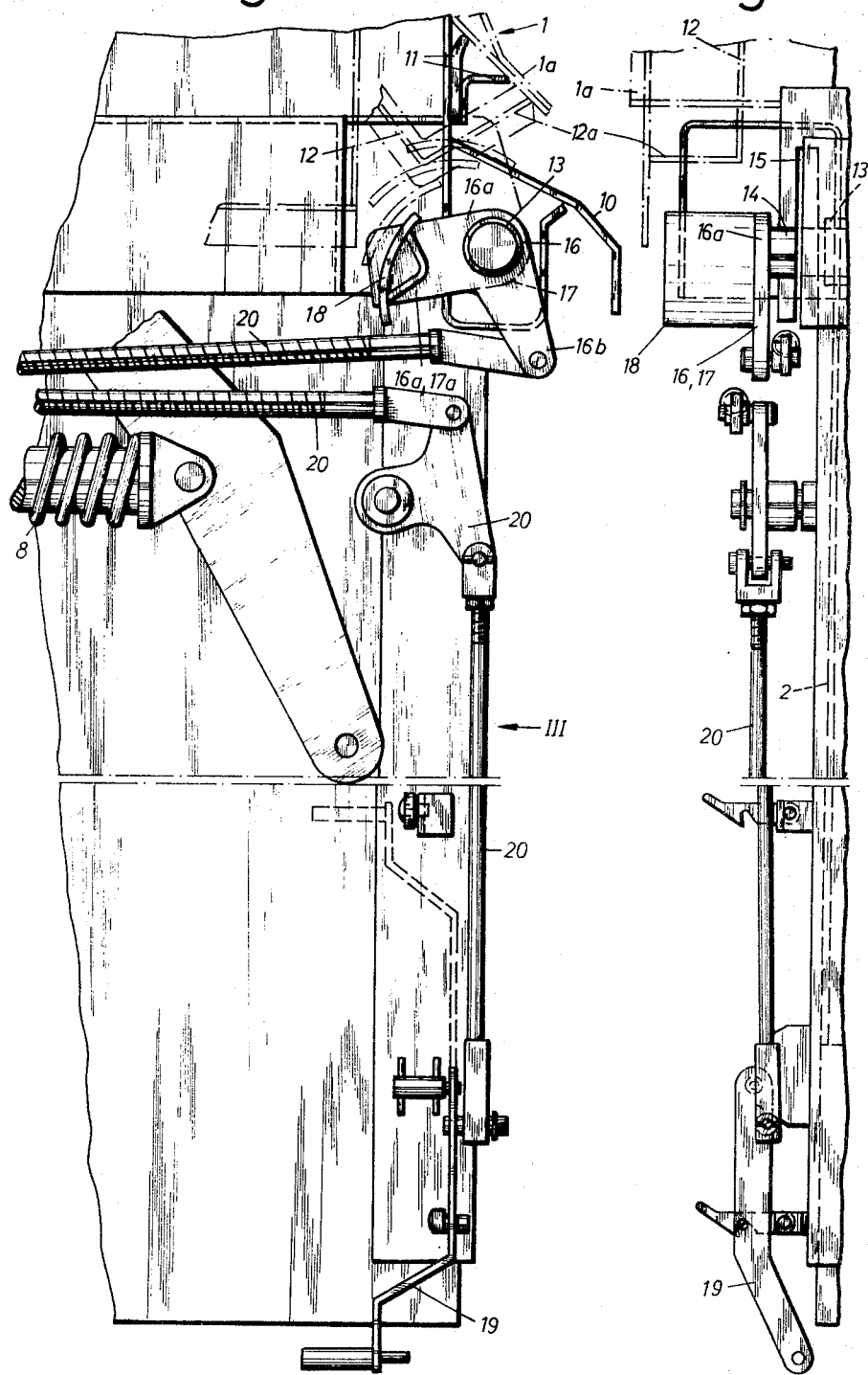
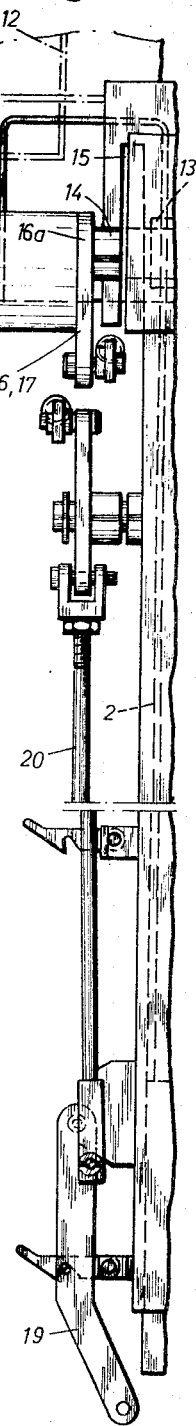

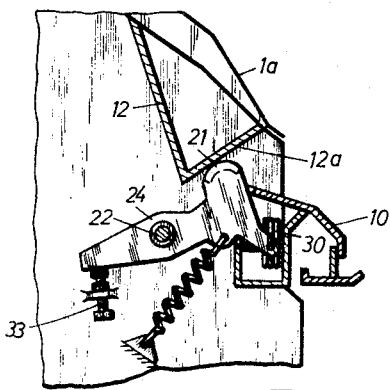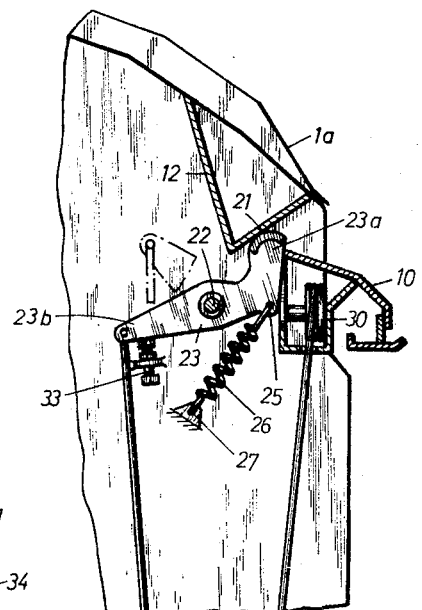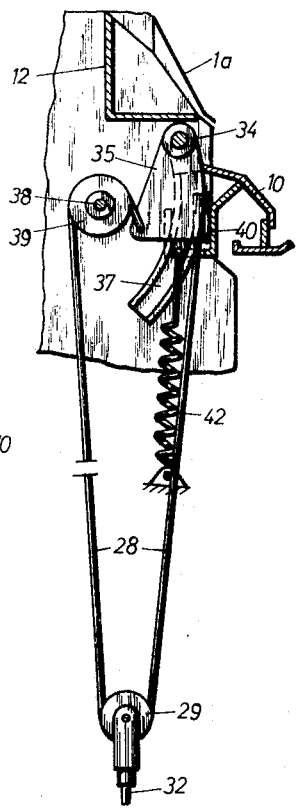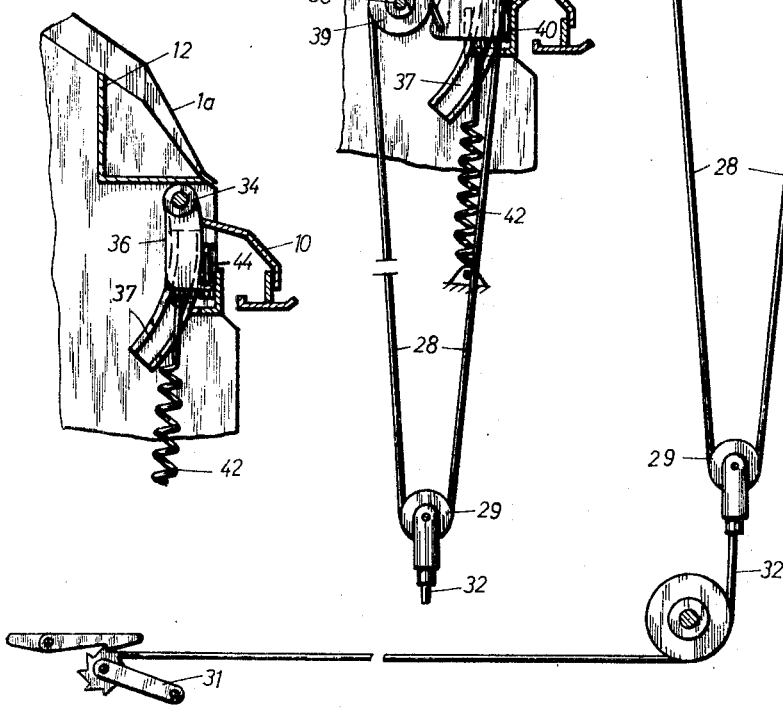

3,512,483
MECHANISM FOR CLOSING A ONE-SHELL ROOF
FOR RAILWAY FREIGHT VEHICLES
Karl Raab, Frankfurt am Main, Helmut Konig, Minden Westphalia, and Christian Stiefel and Wilhelm Blank, Aachen, Germany, assignors to Waggonfabrik Talbot, Aachen, Germany
Filed June 20, 1966, Ser. No. 558,868
Claims priority, application Germany, June 24, 1965,
W 39,409
Int. Cl. B61d *39/00*
U.S. Cl. 105—377                                    10 Claims

ABSTRACT OF THE DISCLOSURE

Closure of a one-shell tiltable roof of freight vehicles, especially railway freight vehicles, extends over the entire length of the car box and in closed position is sealed at the lateral longitudinal edges of the roof with regard to the side wall upper frame while for purposes of obtaining a roof loading opening corresponding to the loading bottom surface of the car, the roof shell is supported at both ends by supporting columns, rotatable at the car end face walls in fixed bearings, and closing devices are operable for each side of the car independently of each other. Pressure members are operable which are adapted to press tangentially to the tilting arc of the roof below the ends of the lateral longitudinal edges of the roof shell of the tilted back roof and thereby force the distorted roof into a closing position parallel to the longitudinal axis of the car and hold the roof in this position.

---

The present invention relates to a mechanism for closing a one-shell tiltable roof of freight vehicles, especially railway freight cars, which roof extends over the entire length of the car box and in closed condition is sealed at the longitudinal edge of the roof relative to the side wall upper frame of the car, while for purposes of obtaining a loading opening corresponding to the loading bottom surface of the car, said roof is tiltable toward either side of the freight car by means of a tilting mechanism at one end of the freight car. The roof shell is supported at both of its ends by supporting columns without any intermediate support, said supporting columns being rotatable at the end faces of the car in fixed bearings, said roof being provided with closing means respectively operable separately for each car side.

Tiltable roofs are generally closed by tilting the roof into a central position with regard to the freight car, by means of a tilting mechanism at one end of the freight car. This central position, however, is by means of the heretofore known tilting mechanisms obtained only for that roof end which is adjacent the driving end, whereas the other roof end due to the unavoidable distortion remains to a greater or lesser extent away from said central position. By the heretofore known tilting mechanisms arranged at one end of the car, that supporting column for the roof shell is automatically moved which is adjacent the said driving end. These movements are by means of levers, torsion shafts, or by means of flexible pulling elements such as cables or chains, transferred to the roof shell supporting column at the other end of the car to bring about synchronism between both supporting columns. However, practical experience has proved again and again that this kind of synchronism is insufficient particularly in the very ranges in which simple non-complicated shells require an exact parallelity of the shell surfaces. It is these areas where the last movements at the very end of the tilting operation are effected.

In view of the unavoidable elasticity of the long flat roof shells and in view of the shrinkage tensions produced in such roof shells by the welding operations which the shell has to undergo, the roofs will, particularly during the closing operation thereof be distorted by considerable forces. Since these forces are effective in the roof shells, they will in view of the long lever arms relative to the fixed supporting column bearings produce considerable torsion moments which are able to absorb only insufficiently the forces of the supporting column coupling elements which act upon the supporting columns and which are effective at relatively much smaller lever arms so that when the intermediate position of one roof end has been secured, the other roof end limps or lags behind with an overshot torsion moment, which means that the roof is non-parallel to the longitudinal axis of the freight car.

It is, therefore, an object of the present invention to provide a closing mechanism for tiltable roofs, which will overcome the above mentioned drawbacks.

It is another object of this invention to provide a closing mechanism as set forth in the preceding paragraph, in which the roof will be brought into a closing position parallel to the longitudinal axis of the freight car by closing forces which separately from the tilting mechanism will force the roof while being in its last closing phase in the said parallel closing position and arrest the roof therein.

These and other objects and advantages of the invention will appear more clearly from the following specification in connection with the accompanying drawings, in which.

Figure 1:
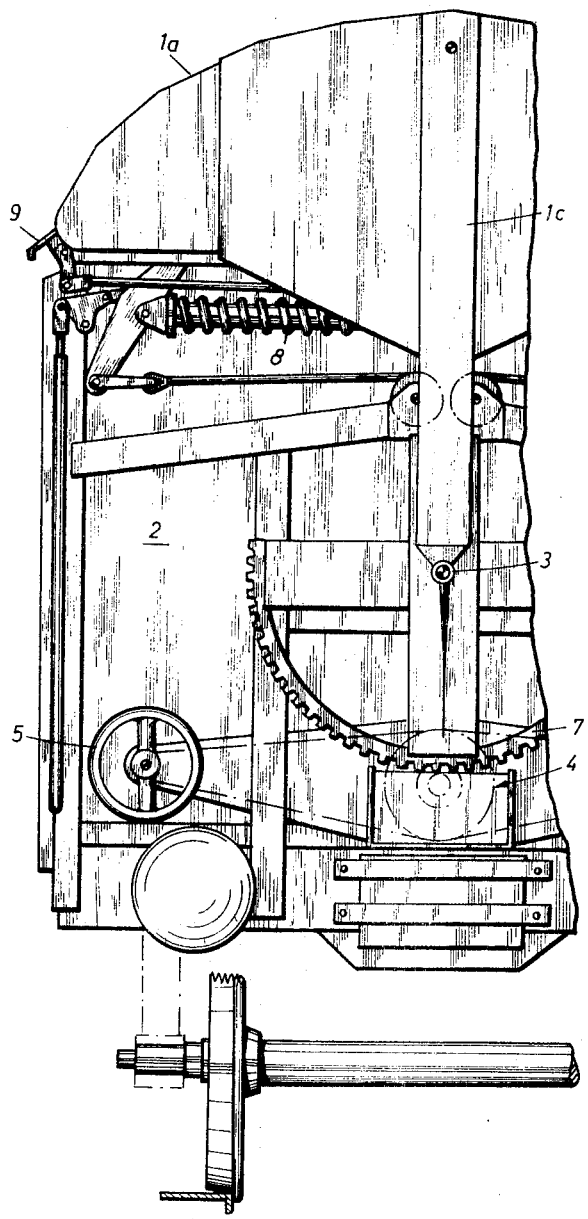
FIG. 1 shows one end view of a freight car with the roof occupying its central closing position, the closing mechanism being in its closing position.
Figure 1A:
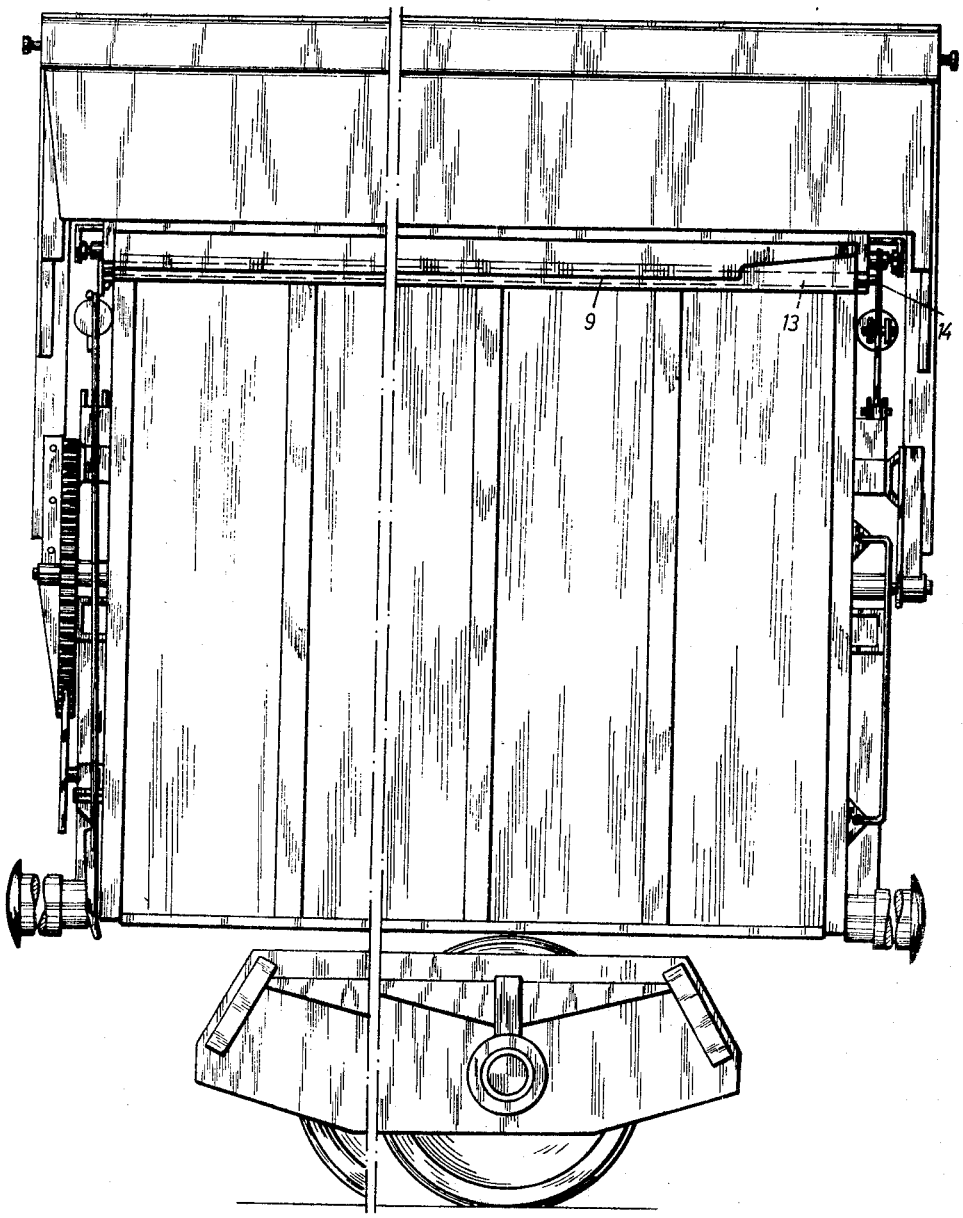
FIG. 1a is a fragmentary side view of the ends of a freight car and FIG. 1b is an end view similar to that of FIG. 1 but showing the closing mechanism and roof in phantom dotted-line representation of its opened position with the closing mechanism and roof represented by full, solid lines to show closed position.
Figure 1B:
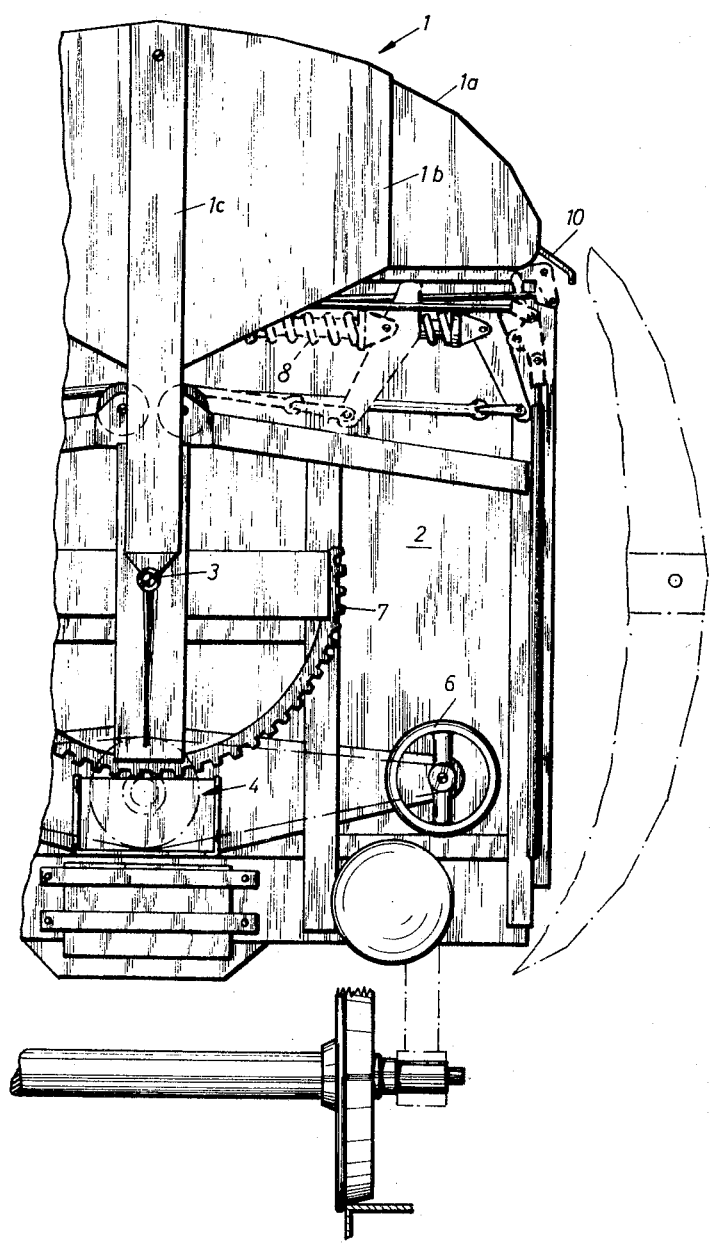

FIG. 2 diagrammatically illustrates the pressure member arrangement and the actuating linkage in open position, while the various positions of the pressure member and the roof support are indicated in dot-dash lines.

FIG. 3 is a view of FIG. 2 as seen in the direction of the arrow III.

FIG. 4 shows the arrangement according to the invention and the closing device for a pressure member which is selectively tiltable and is provided at the drive end of the freight car.

FIG. 5 shows an arrangement for the same pressure member on the non-driving end of the freight car.

FIG. 6 shows the arrangement and closing device for a displaceable pressure member on the driving end.

FIG. 7 shows the arrangement for the same pressure member on the non-driving end of the freight car.

The basic idea of the present invention consists in counteracting the said torsion torque by outer forces acting below the four corners of the roof shell so as to push back the said distortion. The balancing or compensating forces required to this end act in a direction tangential to the tilting arches of the roof and become effective at the same lever arm as the torsion forces while being considerably less than the forces which heretofore had to be absorbed by the coupling elements so that the coupling of the supporting columns can be dispensed with.

In practice, the present invention has been realized by producing the torsion compensating or balancing forces by pressure elements which are mounted on movable levers and which when said levers are actuated press below supports outside the car box and welded below the roof shell. When particularly strong distorted roofs are involved as is the case when the roofs are particularly long, the pressure members may be designed in the form of pressure rollers which are arranged at the ends of sliding members displaceable in corresponding grooves with a long stroke. The levers or sliding members are actuated by means of standard driving devices which are operable independently for each car side from that end face which is located opposite to the tilting side.

The roof is aligned and closed in the following manner. For purposes of opening the roof which is fixed by four pressure members in a precise intermediate position parallel to the longitudinal axis of the freight car, only those pressure members are removed from the tilting range of the roof shell supports which are arranged on the tilting side, whereas those pressure members located on the non-tilting side remain unchanged.

When following the opening of the roof the latter is tilted back for purposes of closing, in which instance it will distort, the roof shell support of that roof shell end which moves ahead will again engage the there located pressure member in unchanged closing position. When actuating the closing device for the tilting side, that pressure member which is located at the lagging roof end presses below the corresponding roof shell support whereby this lagging roof end will with regard to its distortion be wound back until it engages the pressure member which remained non-changed on the non-tilting side. In this final closing position, the roof is by means of the four pressure members again precisely aligned in its central position parallel to the longitudinal axis of the car.

Referring now to the drawings in detail, the one-shell titlable roof 1 comprises the roof shell 1a which extends beyond the end walls 2 of the freight car and also beyond the supporting columns 1c which at the two ends of said roof shell are connected with the end plates or gussets 1b. The supporting columns are rotatable in fixed bearings 3 of the car box end wall. The roof is tiltable by means of a tilting drive 4 arranged at one end of the car which drive 4 is adapted to be actuated by turning of either one of the two handwheels 5, 6 which are arranged laterally of the car end wall, said handwheels 5, 6 preferably being located at that side which is located opposite to the tilting side. Through the intervention of a gear segment 7, it is possible automatically to move the transporting column which is located at this car end. The tilting moments are approximately balanced by the spring storage means 8. The two lateral longitudinal edges of the roof shell will when the roof shell is precisely in its central position, be located above the two side wall upper frames 9, 10 to which there are connected elastic sliding bands 11 which rest sealing against the roof shell lower edge. The roof shell ends which extend beyond the car box length, have lateral supports 12 welded thereonto while the pressure members for the compensation of the distortion and for purposes of fixing the roof press against the lower surface 12a of said supports 12.

According to FIGS. 2 and 3, each car side has within the side wall upper frame 9, 10 hollow shaft 13 extending in longitudinal direction from one car end to the other. At both hollow shaft ends, the hollow shaft 13 is by means of studs 14 welded in longitudinal direction, extended beyond the upper frame ends 9, 11. The studs 14 are rotatably journalled in the end closure plates 15. At the driving end the said stud 14 has welded thereonto a two-arm lever 16, whereas a one-arm lever 17 is welded to the non-driving end. The lever arms 16a and 17a have in similar arrangement welded thereonto the pressure members 18 so that they will be able in response to a rotation of the hollow shaft slip in a wedge-like manner below the pressure surfaces 12a of the supporting member and will thus be able in view of their wedge component to press the roof in tangential direction of the forces into the desired parallel closing position and will arrest the roof in said position.

Hollow shaft 13 is by a force acting upon the lever arm 16b turned by transferring the manual force exerted on the hand lever 19 by means of a linkage 20 onto the lever 16. Since, as mentioned above, roof 1 is tilted by the hand-wheels 5 and 6 at the non-tilting side, for purposes of avoiding awkward and sometimes dangerous changes of the servicing side, the deviating linkage is advantageously so designed that also the closing pressure members on the tilting side will be actuated by the hand lever at the non-tilting side. For precisely fixing the roof in the central area of the car, the said linkages are post-adjustable whereby differences in construction will be compensated for.

FIGS. 4 and 5 show a modification in construction and arrangement and actuation of the pressure members. Similar to FIGS. 2 and 3, each roof shell end has welded thereto supports 12. The pressure members 21 are for each car side welded at each car end onto levers 23, 24 which are rotatable in fixed bearing means 22 or headband journalling means. The lever 23 located at the driving end has two arms. A pressure member 21 is welded on lever arm 23a. This lever arm has an eye 25 in which is suspended under preload a tension spring 26 between said eye and a fixed point 27 on the box end wall. Lever arm 23b is engaged by a cable 28 which passes over a loose roller 29 and reversing rollers 30 through the side wall upper frame to the other car end where it is connected to lever 24 (FIG. 5).

For purposes of closing and arresting the roof, the loose roller 29 is by means of a manual drive 31 arranged at the non-tilting side, pulled downwardly through the intervention of a pulling cable 32 whereby in the two sections of the cable 28 equal pulling forces are produced, and the levers 23 and 24 can be turned into closing position at equal torque. When the roof is distorted, by means of the said cable arrangement, the roof end which runs ahead and is fixed in its central position by the non-turned away pressure member at the non-tilting side, as well as the lagging roof end which has not yet reached its central position will be subjected to the same closing forces. The advantage is seen in the fact that the closed arrested roof will also with distortions of the car box during the driving operation always remain reliably clamped in between the four pressure members at substantially even forces. For purposes of opening the roof, the springs 26 will after elimination of the closing forces pull the pressure members from the tilting range of the roof supports so that the roof can be opened. For purposes of adjusting the roof in its precise central position, the tilting path of levers 23 and 24 is limited by adjustable abutments 33.

FIGS. 6 and 7 illustrate pressure members in the form of pressure rollers 34. These pressure rollers are rotatable at the upper ends of curved sliding members 35, 36. The said sliding members are displaceable in corresponding curved grooves 37 so that they will along an arc be pressed below the supports 12 or pulled out of the tilting range of said supports 12. The sliding members are moved by a manual drive which similar to FIG. 4, by means of a cable 32 is adapted to pull a loose pulley 29 downwardly. The said pulley 29 is suspended on the two sections of cable 28. One of these sections is at the driving end through an upper reversing roller 39 rotatable on the fixed end wall bearing means 38 connected to the sliding member 35 at said end. The other section of cable 28 is passed over a reversing roller 40 through the side wall upper frame and is connected at the non-driving end through the intervention of a reversing roller 44 to an adjacent sliding member 36. By actuating the closing mechanism, the sliding members are pulled upwardly below the supporting members 12 whereby the pressure rollers 34 press below said supporting members for purposes of compensating for the distortion and arresting the roof. When eliminating the closing forces, the tension springs 42 will return the tilting members from the tilting area of the supports. The advantage of this closing device consists primarily in that with very long roofs having considerable distortions, the stroke of movement of the sliding members can be adapted to these considerable distortions.

In every case, it will be noted that when the pressure members are in place at the side edges of the car roof, the roof is not only forced into proper alignment with the car body but is also firmly locked in place in closed position.

To open the roof, the pressure members are first retracted and, thereafter, the roof can be tilted to its open position. The pressure members are moved positively in both directions in the modification of FIGS. 1–3 but in the modification of FIGS. 4–7, the pressure members are moved positively toward roof engaging position while being retracted from the roof by springs.

It is, of course, to be understood that the present invention is, by no means, limited to the particular arrangements shown in the drawings but also comprises any modifications within the scope of the invention.

What is claimed is:

1. In a freight car having a roof extending over the entire length and breadth of the car and supported on the car for tilting laterally of the car to expose the top of the car for loading and for tilting back into position on top of the car to close the top of the car and sealing along the upper side edges of the car when in closed position, that method of forcing the roof into a position of longitudinal alignment with the car when tilted up into closed position and of holding the roof in said closed position which comprises engaging the lateral longitudinal edges of the roof on both sides thereof at points near the ends of the roof, and exerting pressure at said points of engagement in a direction substantially tangentially to the direction of tilting movement of the roof and toward the vertical central longitudinal plane of the car.

2. The method according to claim 1 in which the pressure at opposite ends of the roof on each side are made substantially equal to each other.

3. In a freight car, a body having an open top, a roof for closing said top, support columns connected to the ends of said roof and extending downwardly at the ends of said body and pivoted thereto, a tilting mechanism at at least one end of said body operatively connected to the adjacent column for tilting the column and roof to expose the top of the body for loading or for closing the top of the body, pressure members moveably mounted on the body near the ends of the longitudinal side edges of the roof, and means operable when said roof is in closed position to move said pressure members into engagement with the adjacent ends of the longitudinal side edges of the roof and to cause said members to exert pressure on said ends in a direction tangential to the path of movement of said roof and toward the vertical central longitudinal plane of the said body.

4. A freight car according to claim 3 in which said pressure members comprise rollers to engage the roof, slide members supporting the rollers, and guide means on the ends of the car body guiding said slides to move said rollers toward and away from said roof.

5. A freight car according to claim 3 in which said pressure members on the same side of the car are interconnected for movement in unison and are connected to a common operating element.

6. A freight car according to claim 5 in which said pressure members are in the form of wedge-like members which are pivotally supported for movement into wedging engagement with the said adjacent ends of the longitudinal side edges of the roof.

7. A freight car according to claim 5 in which said operating element positively moves said pressure members in both directions.

8. A freight car according to claim 5 in which said operating element includes cable means for positively moving said pressure members in roof engaging direction, and spring means for retracting said members from the roof upon release of tension in said cable means.

9. A freight car according to claim 3 in which said pressure members are pivotally mounted on the body and are rotatable into engagement with the adjacent ends of the longitudinal side edges of the roof, cable means interconnecting at least the pressure members on the same side of the roof, and equalizing actuating means for said cable means for actuating said members via said cable means while exerting equal forces on the respective members.

10. A freight car according to claim 9 in which cooperating elements of adjustable stop means are provided on each pressure member and the said body adjacent thereto to stop the respective arms in their movement in roof engaging direction.

References Cited

UNITED STATES PATENTS

| | | | |
|---|---|---|---|
| 3,009,426 | 11/1961 | Nampa | 105—377 |
| 3,169,492 | 2/1965 | Stiefel et al. | 105—377 |
| 3,368,500 | 2/1968 | Raab et al. | 105—377 |

ARTHUR L. LA POINT, Primary Examiner